United States Patent
Yelanich et al.

(10) Patent No.: US 6,711,850 B2
(45) Date of Patent: Mar. 30, 2004

(54) PLANT GROWTH MEDIA AND PROCESSES FOR PRODUCTION THEREOF AND COMPOSITIONS FOR USE THEREIN

(75) Inventors: Mark Yelanich, Columbus, OH (US); Richard P. Vetanovetz, Marysville, OH (US)

(73) Assignee: OMS Investments, Inc., Los Angeles, CA (US)

( * ) Notice: Subject to any disclaimer, the term of this patent is extended or adjusted under 35 U.S.C. 154(b) by 0 days.

(21) Appl. No.: 10/045,224

(22) Filed: Nov. 9, 2001

(65) Prior Publication Data

US 2003/0089152 A1 May 15, 2003

(51) Int. Cl.[7] .............................. A01G 7/00; A01G 31/00
(52) U.S. Cl. ...................... 47/59 R; 47/595; 47/58.1 R
(58) Field of Search ............................. 47/59 R, 59 S, 47/58.1 R, 58.1 SC

(56) References Cited

U.S. PATENT DOCUMENTS

| | | | |
|---|---|---|---|
| 4,088,528 A | 5/1978 | Berger et al. | |
| 4,185,680 A | 1/1980 | Lawson | |
| 4,771,571 A | * 9/1988 | Obrero et al. | ........... 47/58.1 R |
| 4,933,428 A | * 6/1990 | Piepho et al. | ............... 528/272 |
| 5,269,634 A | 12/1993 | Chynoweth et al. | |
| 5,413,618 A | 5/1995 | Penningsfeld et al. | |
| 5,458,662 A | * 10/1995 | Toyone | ...................... 47/62 R |
| 5,458,877 A | * 10/1995 | Obayashi et al. | ........... 424/770 |
| 5,542,962 A | 8/1996 | Ollerenshaw et al. | |
| 5,567,220 A | 10/1996 | Thorpe et al. | |
| 5,900,038 A | 5/1999 | Wilhelm et al. | |
| 5,976,211 A | 11/1999 | Fjelldal et al. | |
| 6,189,260 B1 | 2/2001 | Kusey et al. | |
| 6,219,968 B1 | * 4/2001 | Belger et al. | ................... 47/74 |
| 6,408,568 B1 | * 6/2002 | Kusey et al. | ..................... 47/9 |

FOREIGN PATENT DOCUMENTS

| | | | |
|---|---|---|---|
| EP | 0923854 | 6/1999 | |
| JP | 08081936 A | * 3/1996 | ............. E02B/3/12 |
| WO | WO 9957079 | 11/1999 | |
| WO | WO 9957080 | 11/1999 | |

OTHER PUBLICATIONS

U.S. patent application Ser. No. 09/768169, filed Jan. 23, 2001, Kusey et al.

* cited by examiner

Primary Examiner—Son T. Nguyen
(74) Attorney, Agent, or Firm—Jones Day

(57) ABSTRACT

A pre-mix composition is disclosed for use in treating a plant growth medium to promote improved wetting and re-wetting thereof comprising a mixture of coconut coir pith and a horticulturally acceptable surfactant. A process for treating a plant growth medium utilizing such pre-mix composition is also disclosed as well as the treated plant growth medium.

29 Claims, 2 Drawing Sheets

PLANT GROWTH MEDIA AND PROCESSES FOR PRODUCTION THEREOF AND COMPOSITIONS FOR USE THEREIN

BACKGROUND OF THE INVENTION

1. Field of the Invention

The present invention relates to pre-mix compositions for use in plant growth media and to plant growth media having such pre-mixes incorporated therein as well as to processes for producing such plant growth media. More particularly, it relates to blended or mixed coconut coir pith/surfactant compositions formulated to be incorporated into plant growth media to enable enhanced wetting thereof, while the media are being used, and re-wetting, if the media have dried out and to plant growth media having such pre-mixed compositions containing coconut pith ("coir") and selected surfactants incorporated therein to promote new and improved wetting and re-wetting characteristics therein and to processes for producing such plant growth media.

2. Description of Related Art

Examples of organic matter suitable for use as plant growth media in the present invention include peat moss, sphagnum peat, sedge peat (also known as "Florida" peat), potting soils such as top soils,. composted yard waste (e.g., composted grass clippings, leaves, mulch, hedge trimmings and the like); wood and lignocellulose derivatives (e.g., wood chips, wood pulp such as fluffed pulp, extruded wood, pressure treated wood and the like); composted bark (e.g., pine bark and other barks); agricultural waste products such as the remnants produced, for example, during harvesting of grains and beans including materials such as straw and grain husks; animal waste products such as cattle, pig, chicken and/or horse manure; livestock processing by-products such as blood meal and the like; organic waste materials resulting from treated municipal sewage sludge; organic waste materials resulting from treated landfill materials comprising residential and commercial food, paper and yard waste.

Examples of the foregoing types of plant growth media, and processes for obtaining them, are well known in the art. In this regard, reference may be had to disclosures such as those included in U.S. Pat. Nos. 4,088,528; 4,185,680; 5,269,634; 5,413,618; 5,542,962; 5,567,220; 5,976,211; 5,900,038; European Patent EPO 923 854; and PCT applications WO 99/57079 and WO 99/57080, all of which are incorporated herein by reference.

Relatively recently, it has been recognized that coconut coir pith material provides an excellent growing medium for plants and it has been suggested that coconut coir pith could provide an effective alternative to previously standard growing media such as peat moss. Coconut coir pith is very similar to sphagnum peat moss in appearance having a light to dark brown color and consisting primarily of particles in the size range of 0.2–2.0 mm (75–90%). Unlike sphagnum peat, however, there are no sticks or extraneous matter in the coconut coir pith. Furthermore, sphagnum peat moss has a density of about 7 lbs/cu ft when fluffed (30–50% moisture content) whereas coir pith is much denser (i.e., about 43 lbs/cu ft at about 20% moisture content when compressed at a ratio of 5:1 on volume to volume basis and about 25 lbs/cu ft when fluffed and having a 50–55% moisture content).

Additional analysis of coconut coir pith in comparison with sedge peat and sphagnum peat products has indicated that coconut coir pith has superior structural stability because of the high lignin to cellulose content of the pith which prevents oxidation and shrinkage as compared with peat moss which has a high cellulose to lignin content.

Normally, coconut coir pith to be used as a plant growth medium is prepared by collecting aged pith from existing waste dumps or newly processed pith and drying the material to a 20% moisture content and then compressing the pith into bricks at a compression ratio of about 5:1 (v/v). These compressed bricks can then be expanded by adding water at about 80% moisture content although some mechanical agitation is required in order to increase the output of the fluffed "outturned" coir pith. This mechanical agitation requirement presents a disadvantage in processing coir pith as it presents an inconvenience and expense for growers and other end users of the product. A further disadvantage in the processing of coir pith as a plant growth medium is that, unlike compressed bales of peat moss which can be readily fluffed or outturned to yield a desirable fluffed product, coir pith takes considerably more time to be fluffed or "outturned".

Accordingly, it has been well known in the art to combine peat moss and coir pith in a non-compressed form. Such non-compressed mixtures of coir and peat moss are produced by initially decompressing bricks of compressed coir pith and bales of compressed peat moss to provide separate fluffed coir pith and fluffed peat moss raw materials. Then, the already fluffed materials are mixed together for distribution as a "loose-fill" product containing the decompressed, fluffed mixture of coir pith and peat moss. The fluffed products produced in this manner have been demonstrated to provide better media for growing plants than the media provided by coir pith or peat moss alone.

Certain processing difficulties observed with coir when used alone, as well as commercial limitations of loose fill mixtures of non compressed coir and peat moss, were successfully addressed in commonly assigned Kusey et al U.S. Pat. No. 6,189,260 entitled "Compressed Mixtures of Coconut Coir Pith and Peat Moss and Processes for the Preparation Thereof", which patent is incorporated herein by reference and made a part hereof. Also, U.S. Pat. No. 6,189,260 disclosed that a surprising improvement in fluffed yield can be achieved when coir pith and peat moss, under controlled moisture conditions, are first compressed to form a baled product, and then decompressed via fluffing or outturning for ultimate use as a growth medium. In particular, U.S. Pat. No. 6,189,260 disclosed that decompression of a compressed coir/peat moss blend yields a final volume of fluffed product that is unexpectedly greater than the sum of the individual volumes of coir and peat moss used to produce the initial pre-compressed blend.

Thus, the use of coconut coir pith as a plant growth medium per se is known in the art. Also, as described in co-pending, commonly assigned Kusey et al U.S. patent application Ser. No. 09/768,169, entitled "Compressed Blends of Coconut Coir Pith and Non-Coir, Non-Peat Materials and Processes for the Production Thereof", the use of coconut coir pith blended with either peat moss or a variety of other soil enhancing non-coir/non-peat ingredients (both organic and inorganic) have been demonstrated to provide excellent media for growing plants and the like.

In addition, it has been known heretofore to incorporate surfactants, often called wetting agents, into plant growth media such as potting media to aid in wetting of the growth media. However, significant problems have been encountered when such surfactants or wetting agents have been incorporated into growth media or potting media. That is, if the surfactant treated plant growth medium is dried out, for example, as a result of the storage of the treated growth medium for an extended period of time before use, the efficacy of the surfactant declines so that the growth media cannot be effectively re-wet after such time period. Also, it has been found that the effectiveness of a surfactant as a wetting agent to maintain the moisture content of growth media tends to disadvantageously decline over time once the growth media is in use.

In view of these problems, a need has been recognized in the horticultural arts for more effective and efficient compositions to be used to treat plant growth media in order to provide new and improved wetting and re-wetting characteristics in the treated growth media (i.e., to maintain the moisture content of the plant growth media over a period of time up to several months after application and/or to enable the growth media to be effectively wet after the plant growth media dries out); for processes to produce such growth media which exhibit new and improved wetting and re-wetting characteristics including an enhanced ability to be re-wet after they have been dried out, particularly as a result of storage or the like; and for treated growth media which demonstrate the foregoing advantageous characteristics.

Accordingly, it is a general object of the present invention to provide compositions for treating plant growth media to promote improved wetting and re-wetting thereof. In particular, it is a primary object of the present invention to provide premix compositions containing coconut coir pith and selected horticulturally acceptable surfactants or wetting agents for use in treating plant growth media.

A further object of the invention is to provide processes for producing plant growth media by incorporating of mixtures of coconut coir pith and horticulturally acceptable surfactants therein in sufficient amounts to enable the treated growth media to exhibit new and improved wetting and re-wetting characteristics, particularly after being dried out Another important object of this invention is to provide plant growth media having mixtures of coconut coir pith and horticulturally acceptable surfactants incorporated therein in amounts sufficient to enable effective and efficient wetting and re-wetting of the growth media during use and/or after the growth media has become dried out.

These and other objects will become apparent hereinafter to those skilled in the art.

SUMMARY OF THE INVENTION

We have found that the foregoing and other objects as well as further improvements over the prior art of the present invention may be achieved by forming a pre-mix composition containing coconut coir pith (sometimes referred to herein as "coir") and a horticulturally acceptable surfactant, either ionic or non-ionic in nature, in a predetermined percent by weight of the surfactant to the total weight of the pre-mix composition. Then, in accordance with the present invention, the pre-mix composition is incorporated into a suitable plant growth medium such as the above-discussed blends of coconut coir pith and peat moss and blends of coconut coir pith and non-peat materials. Other common plant growth media which may also be used herein include peat moss, coconut coir pith, top soil, sphagnum peat, perlite, vermiculite, styrofoam and the like and composted organic materials such as bark, lignocellulites and the like to aid in wetting of the growth or potting media in an amount sufficient to enable effective and cost efficient wetting and re-wetting of the growth medium during use and/or after the growth medium has become dried out, for example, as a result of storage of the growth medium over an extended period of time.

Thus, in one aspect, the present invention is directed to a pre-mix composition for treating a plant growth medium to promote improved wetting and re-wetting thereof comprising a mixture of coconut coir pith and a horticulturally acceptable surfactant.

In a further aspect, the present invention provides a process for treating a plant growth medium comprising incorporating a pre-mixed blend of coconut coir pith and a horticulturally acceptable surfactant into the plant growth medium in an amount sufficient to promote improved wetting of the plant growth medium during use, before it becomes dried out, and to enable rewetting of the plant growth medium after it has dried out.

In a still further aspect of this invention, a plant growth medium is provided having a pre-mixed blend of coconut coir pith and a horticulturally acceptable surfactant incorporated therein in an amount sufficient to promote improved wetting of the plant growth medium during use, before it becomes dried out, and to enable re-wetting of the plant growth medium after it has dried out.

Accordingly, the present invention offers a number of significant advantages over the prior art. For example, the present invention enables solution of the significant problem that has been encountered concerning the decline in re-wetting efficacy which has been found to occur in plant growth media treated with prior surfactants/wetting agents which have been stored before use for long periods of time. Also the present invention enables solution of another significant problem that has been encountered concerning the decline in the continued wetting effectiveness of prior surfactants/wetting agent once in use.

DETAILED DESCRIPTION OF A PREFERRED EMBODIMENT OF THE INVENTION

Figure 1:
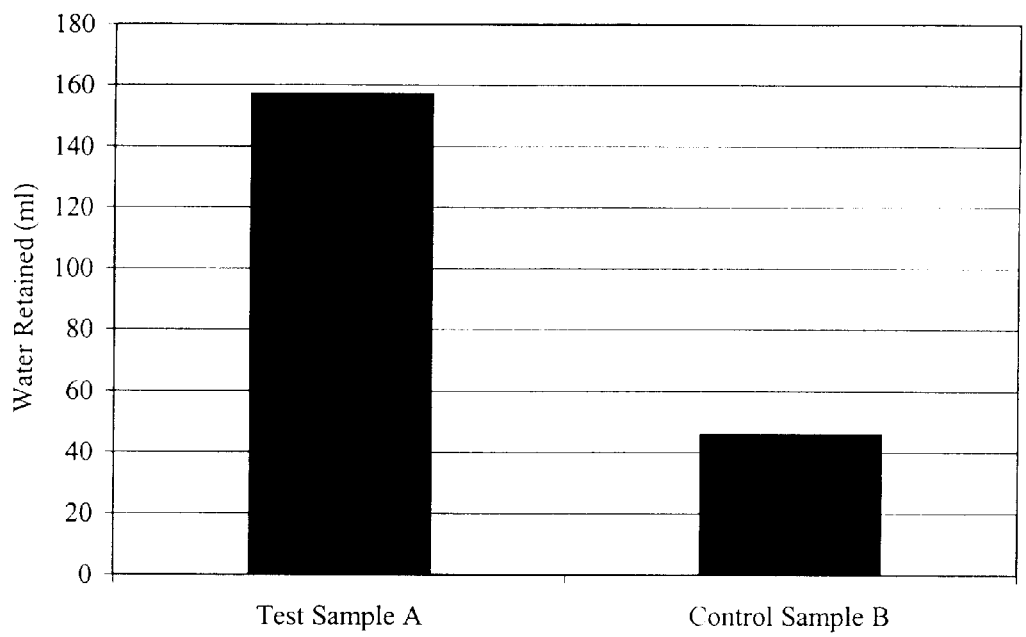
FIG. 1 is a graph showing the wetting results achieved utilizing a pre-mix composition in accordance with the present invention incorporated into a plant growth medium as compared with a control.

A pre-mix composition for use in the present invention comprises a blend or mixture of coconut coir pith and a horticulturally acceptable surfactant. The pre-mix is formulated so that the surfactant constitutes a predetermined percent by weight of the combined or total weight of the pre-mix composition. In a preferred embodiment, the surfactant comprises about 10% of the combined or total weight of the pre-mix composition up to about 70% of the combined or total weight of the pre-mix composition. In a most preferred embodiment, the surfactant comprises about 50% of the combined or total weight of the pre-mix composition.

A process in accordance with the present invention for treating a plant growth medium comprises incorporating a pre-mixed blend of coconut coir pith and a horticulturally acceptable surfactant, including ionic and non-ionic surfactants and mixtures thereof, into the plant growth medium in an amount sufficient to promote improved wetting of the plant growth medium during use, before it becomes dried out, and re-wetting of the plant growth medium after it has dried out. Preferably, the pre-mix composition is incorporated into the plant growth medium in an amount sufficient to supply the treated growth medium with from about 0.25 to about 30 fluid ounces of surfactant from the pre-mix per cubic yard of the plant growth medium.

In formulating the pre-mix compositions of this invention, the coconut coir pith and the surfactant components of the pre-mix should be thoroughly blended, before introduction of the composition into a plant growth medium. Upon application, the blended pre-mix composition should be thoroughly mixed into the growth medium and care should be taken to avoid forming clumps in the medium in order to achieve optimal results. Generally, even distribution of the pre-mix composition in the plant growth medium is preferred.

As noted previously, suitable plant growth media to be treated by incorporating the pre-mixes of this invention therein may include blends of coconut coir pith and peat moss, coconut coir pith and non-peat materials or any other common plant growth media such as, blended or unblended, peat moss, coconut coir pith, top soil, sphagnum peat, composted organic materials such as bark and the like. Examples of horticulturally acceptable non-coir/non-peat materials or ingredients for admixture with the pre-mix compositions of the present invention include, by way of example and not by way of limitation, composted yard waste; composted bark; composted manure; peat humus; composted agricultural waste; composted animal byproducts; treated sewage sludge; animal and/or vegetable-based landfill waste; vermiculite; perlite; glass beads; foamed plastics, and mixtures thereof.

As used in the present invention, the term "non-coir" as applied to a component of the blends of the present invention is intended to denote a material which is essentially free of coir pith but is not intended to exclude trace amounts of coir which may be present, e.g., as residue from other manufacturing operations, but which provide no material horticultural effect. As used herein, the term "non-peat" when used to describe a horticulturally acceptable growth medium, is intended to denote an ingredient which is essentially free of peat moss, but is not intended to exclude trace amounts thereof which may be present, e.g., as residue from other manufacturing operations, but which provide no material horticultural benefit; nor is it intended to exclude composted peat moss (i.e., peat humus). The horticulturally acceptable, non-coir/non-peat material may be selected from organic matter, inorganic matter, or combinations thereof. As used herein, the terms "organics", "organic matter", "organic materials" and the like are intended to denote any type of non-coir/non-peat vegetable and/or animal organic materials suitable for use as a plant growth medium.

Exemplary of suitable horticulturally acceptable non-ionic surfactants for use in the present invention are alkoxylated polyols such as ethoxylated alkylphenols. A representative alkoxylated polyol non-ionic surfactant is a block copolymer of polyoxyethylene and polyoxypropylene sold by BASF Corporation under the Trade Name PLURONIC L62. Other commercially available non-ionic surfactants usable in preparing the pre-mix compositions of this invention include products sold as a proprietary non-ionic surfactant by Aquatrols Corporation of America under the Trade Name ACA 2000M and proprietary blends of non-ionic surfactants sold by Smithers-Oasis U.S.A. under the Trade Name OASIS SOAX and by Aquatrols Corporation of America under the Trade Name PSI MATRIC. Exemplary of significant horticulturally acceptable ionic surfactants for use in forming the pre-mix compositions of the present invention are alkyl-aryl polyglycol ether sulfate, sodium salts sold by Clariant Corporation under the Trade Name HOSTAPAL BV CONCENTRATE.

Concerning the use of the coconut coir pith component of the pre-mix compositions of the present invention, we have found that coconut coir pith possesses certain physical properties that enable it to provide an excellent "metering" effect when the pre-mix composition is incorporated in a plant growth medium resulting in the enhanced performance of the present premix compositions when they are incorporated into a plant growth medium. That is, coconut coir pith has an internal physical structure that readily absorbs liquids and we have found that this internal structure can be filled with appropriate surfactants/wetting agents so that the surfactants/wetting agents are retained within this internal structure of the coconut coir pith and are slowly released therefrom over time. In this manner, we have found that the combined or blended mixtures of coconut coir pith and surfactants of the present invention act in a metering capacity whereby the surfactants are slowly released over time from the mixture into the surrounding plant growth medium after application.

Coconut coir pith is a by-product of the coconut husk fiber processing industry. Coir is the name given to the fibrous material that constitutes the thick mesocarp (middle layer) of the coconut fruit (Cocos nucifera). In processing, the long fibers of coir are extracted from the coconut husk for use in the manufacture of brushes, upholstery stuffing, filters, twine and like products. The short fibers (2 mm or less) and dust (collectively referred to herein as "pith") traditionally have accumulated in large piles or "dumps" as a waste product resulting from the processing of coconut husks to obtain the industrially valuable long fibers.

Coconut coir pith has a high lignin to cellulose content which prevents oxidation and resultant shrinkage. Accordingly, these materials do not decompose rapidly, resulting in the "dumps" of material which have remained as accumulated waste for extended periods of time with essentially no industrial applicability other than for burning.

The following examples are provided to illustrate preferred embodiments of the pre-mix compositions of the invention, the preferred process of incorporating the pre-mix compositions into a plant growth medium preparation and comparative evaluations with prior art compositions.

This example is intended to demonstrate that the pre-mix composition of the present invention containing coconut coir pith and a surfactant provides enhanced wetting characteristics in plant growth media such as potting soil.

EXAMPLE 1

A pre-mix composition was prepared by mixing 601.40 grams of dry coconut coir pith (20% or less moisture content w/w) with 400 grams of a non-ionic surfactant (an alkoxylated polyol non-ionic surfactant comprising a block copolymer of polyoxyethylene and polyoxypropylene sold by BASF Corporation under the Trade Name PLURONIC L62) and 3600 grams water. To improve the flowability, the mixture was then air dried in a glass greenhouse and the resulting dried pre-mix composition was weighed and it was determined that the total weight of the pre-mix composition was 983 grams. Thus, the surfactant content of the pre-mix composition was calculated to be 40.7% (400 grams surfactant in the composition/983 grams total weight of the pre-mix composition).

Then, 0.70 grams of the dried pre-mix composition containing 40.7% surfactant was incorporated into one liter of a plant growth medium containing 70% (by volume) sphagnum peat moss and 30% (by volume) coir pith. This amount of pre-mix supplied a quantity of 0.28 grams of PLURONIC L62 surfactant into the growth medium which was calculated to be sufficient to provide a desired rate of application to the growth medium of about 0.25 ml per liter of growth medium (about 6.5 fluid ounces surfactant per cubic yard of growth medium).

When the so treated plant growth medium (potting mix) was placed in 3" pots and 250 milliliters of water was applied thereto, it was found the plant growth medium containing the coconut coir pith/surfactant pre-mix composition (Test Sample A) held more water than a control plant growth medium containing no surfactant (Control Sample B) as determined by weighing the samples before the water was applied and after the water had drained from the samples. The results of this testing are illustrated in FIG. 1.

EXAMPLE 2

This example is intended to demonstrate that it is the pre-mix composition of the present invention containing coconut coir pith and a surfactant that provides enhanced re-wetting characteristics in plant growth media such as potting soil and not the surfactant alone.

A premix composition of the present invention was prepared by mixing 70 grams of dried coconut coir pith with 70 grams of a non-ionic surfactant (a proprietary non-ionic surfactant sold by Aquatrols Corporation of American under the trade name ACA 2000M). Thus, the surfactant content of the pre-mix composition was calculated to be 50% (70 grams surfactant in the composition/140 grams total weight of the pre mix composition).

A potting soil containing 45% Sphagnum Peat, 45% Composted Bark Fines, 10% Perlite Mix was made and then separated into 3 batches. The following treatments were applied to the potting soil batches:

1. 4 fl oz of ACA 2000M surfactant per cubic yard was applied to the first batch of potting soil as a spray;
2. 4 fl oz of ACA 2000M surfactant per cubic yard was applied to the second batch of potting soil in the form of the above-described pre-mix composition (i.e., after the ACA 2000M surfactant was blended at 50% by weight with coconut coir pith); and
3. A control sample containing no additive coconut coir pith or surfactant was employed as the third batch of potting soil.

The plant growth medium from each of the three treatments was further subdivided into seven 1 liter plastic bags and each was sealed. These bags were then stored at room temperature for up to 6 months. Every month, after mixing, 1 bag from each treatment was removed and allowed to air dry to less than 20% (w/w) moisture content. The media was then placed in 3" pots and irrigated with 200 milliliters of water. The percentage of dry media was determined by a procedure wherein the amount of water retained after irrigation was measured by comparing the initial weight of the media in the pot prior to wetting with the final weight of the media in the pot after the water was drained. The maximum amount of water which could have been retained in the media in the pots was measured by weighing the pots after immersion in water for twelve hours and subtracting the initial weight of the media in the pot from this post immersion measurement. The percentage of dry media was calculated by dividing the amount of water retained by the maximum amount of water to obtain the percent wet media and subtracting the resulting percent wet media from 100% to determine the percentage dry media.

Figure 2:
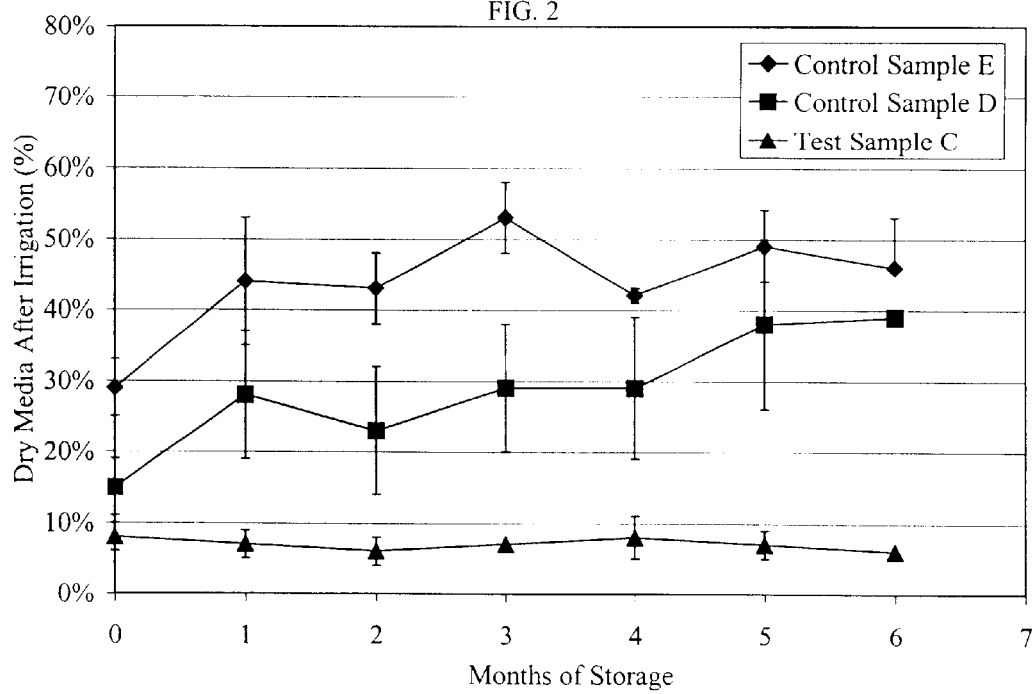
FIG. 2 is a graph showing the rewetting results achieved utilizing a pre-mix composition in accordance with the present invention incorporated into a plant growth medium as compared with a control plant growth medium treated only with a surfactant and another control plant growth medium containing no surfactant and/or coconut coir pith.

From this test it was determined that the pre-blended combination of coconut coir pith and surfactant (Test Sample C) provided better re-wetting characteristics in terms of water retention (i.e., lower percentage dry media) that lasts for longer periods of time than the control sample containing only the surfactant (Control Sample D) and the control sample containing no additives (Control Sample E). After the six month period, the pre-blended combination of coconut coir pith and surfactant (Test Sample C) exhibited little decrease in re-wetting as indicated by continued lower percentages of dry media whereas the surfactant alone (Control Sample D) was no different than the control containing no additive ingredients (Control Sample E). The results of this test are illustrated in FIG. 2.

EXAMPLE 3

This example is intended to demonstrate that it is the pre-mix combination of the present invention containing coconut coir pith and a surfactant that provides enhanced wetting characteristics in plant growth media such as potting soil and not the coconut coir pith carrier alone.

A potting soil containing of 45% Sphagnum Peat, 45% Composted Bark Fines, 10% Perlite Mix was made and then separated into 3 batches. The following treatments were applied to the potting soil:

1. 4 fl oz per cubic yard of ACA 2000M surfactant was applied to the first batch of potting soil in the form of a pre-mix composition of the surfactant blended at 50% by weight with coconut coir pith in accordance with the procedure described in Example 2;
2. The same amount of coconut coir pith was applied to the potting soil as in treatment 1 above but no surfactant was blended with the coconut coir pith;
3. A control sample containing no additive coconut coir pith or surfactant was employed as the third batch of potting soil.

After the above potting soil media were prepared, they were allowed to air dry to a moisture content of less than 20% (w/w). Then, the media was placed in 4" pots and irrigated with 200 milliliters of water. The percentage of dry media was determined by dividing the amount of water retained after this irrigation by the maximum amount of water that could be retained in accordance with the procedure outlined in Example 2.

Figure 3:
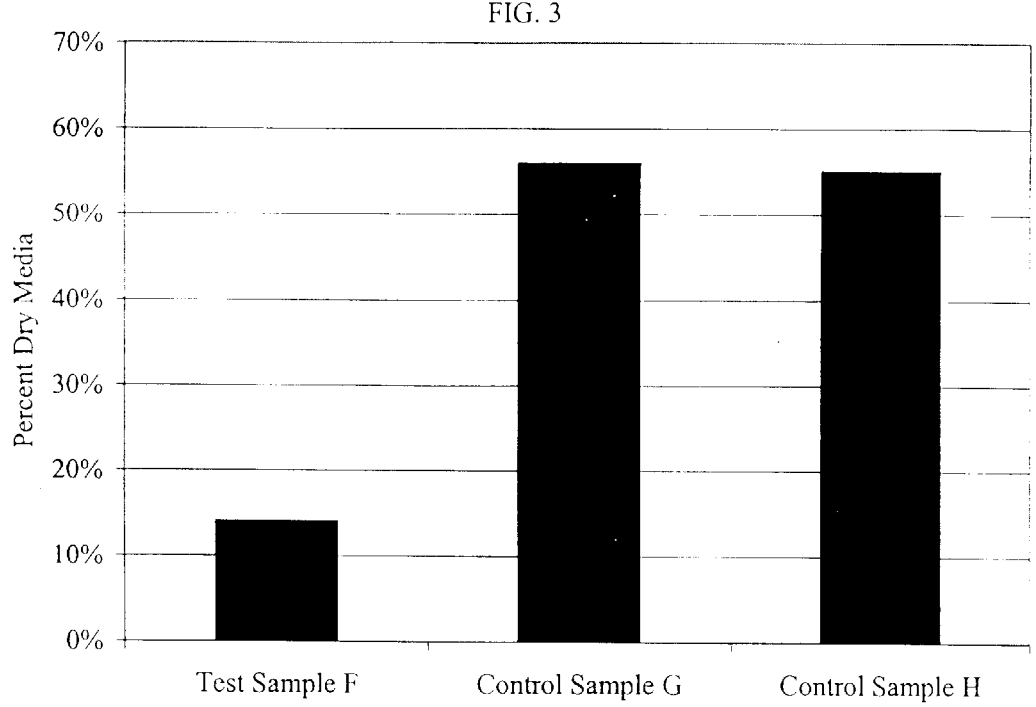
FIG. 3 is a graph showing the wetting results achieved utilizing a composition comprising a pre-blended combination of coconut coir pith and surfactant as compared with control samples treated with coconut coir pith without surfactant and with surfactant alone.

From this test it was concluded that it is the pre-blended combination of coconut coir pith and surfactant (Test Sample F) that provides the new and improved wetting characteristics of the present invention. That is, when coconut coir pith was used without surfactant (Control Sample G) no reduction in dry media occurred as compared to the control sample containing no additives (Control Sample H) whereas the plant growth medium treated with the pre-blended combination of the present invention including coconut coir pith and surfactant (Test Sample F) demonstrated significantly improved wetting performance in terms of significant, reduced percent of dry media in comparison with the Control Samples G and H. The results of this testing are illustrated in FIG. 3.

EXAMPLE 4

A potting soil containing 45% Sphagnum Peat, 45% Composted Bark Fines, 10% Perlite Mix was made and then separated into 5 batches. Coconut coir pith was combined with surfactant at 10%, 30%, 50% and 70% by weight and each of these four combinations was mixed into a separate sample of potting soil at a rate of 4 fl oz per cubic yard of surfactant (Test Samples I–L, respectively). Another sample containing 90% by weight of the coconut coir pith/surfactant pre-mix was found to be too liquid/"soupy" to be effective for treatment of the potting soil. A further sample was prepared containing no coconut coir pith and/or surfactant (Control Sample M).

After mixing, the treated media were allowed to air dry to a moisture content of less than 20% (w/w). Then, each of the treated media was placed in 4" pots and irrigated with 200 milliliters of water. The percentage of dry media was determined by dividing the amount of water retained after this irrigation by the maximum amount of water that could be retained in accordance with the procedure outlined in Example 2.

Figure 4:
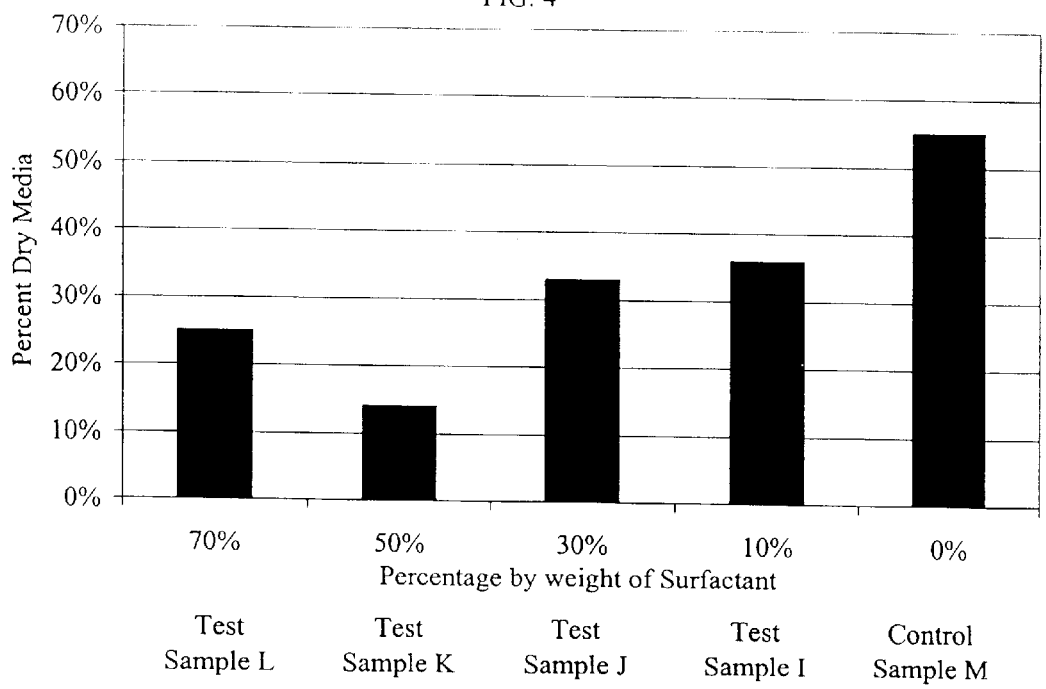
FIG. 4 is a graph showing the comparative wetting results achieved utilizing varying percentages of surfactant in coconut coir pith/surfactant pre-mix blends of the present invention.

It was observed that all of the four potting soil samples treated with the pre-blended combinations of coconut coir pith and the surfactant decreased the amount of dry media and provided improved re-wetting as compared with Control Sample M). It was further determined that optimal results were achieved employing a pre-mix composition containing the surfactant in an amount of 50% by weight of the total weight of the coconut coir pith/surfactant pre-mix composition (Example K). The results of this testing are illustrated in FIG. 4.

EXAMPLE 5

A pre-mix composition is formed by blending 50% by weight of an ionic surfactant (an alkyl-aryl polyglycol ether sulfate sodium salt sold by Clariant Corporation under the Trade Name HOSTAPAL BV CONCENTRATE) with 50% by weight dry coconut coir pith. The pre-mix is then applied to a plant growth medium at a rate sufficient to supply 4 fluid ounces of the HOSTAPAL BV CONCENTRATE surfactant per cubic yard of the medium. This calculates to 0.28 pounds of HOSTAPAL BV CONCENTRATE surfactant in the pre-mix composition applied to per cubic yard of plant growth media.

Although the invention has been described in its preferred forms with a certain degree of particularity, it is to be understood that the present disclosure has been made by way of example only. Numerous changes in the details of the compositions and in the operational steps of the processes and in the materials utilized therein will be apparent without departing from the spirit and scope of the invention, as defined in the appended claims.

We claim:

1. A pre-mix composition for use in treating a plant growth medium to promote improved wetting and re-wetting thereof comprising a mixture of coconut coir pith and a horticulturally acceptable surfactant, the surfactant being absorbed within the coconut coir pith so that the surfactant releases slowly over time from the coconut coir pith.

2. The pre-mix composition of claim 1 wherein the surfactant is present in the pre-mix composition in a predetermined percent by weight of the total weight of the pre-mix.

3. The pre-mix composition of claim 2 wherein the surfactant is present in the pre-mix composition in an amount ranging from about 10% to about 70% of the total weight of the premix composition.

4. The pre-mix composition of claim 3 wherein the surfactant is present in the pre-mix composition in an amount of about 50% of the total weight of the pre-mix composition.

5. The pre-mix composition of claim 2 wherein the surfactant is a non-ionic surfactant.

6. The pre-mix composition of claim 5 wherein the non-ionic surfactant is an alkoxylated polyol.

7. The pre-mix composition of claim 6 wherein the non-ionic surfactants is an ethoxylated alkylphenol.

8. The pre-mix composition of claim 2 wherein the surfactant is an ionic surfactant.

9. The pre-mix composition of claim 8 wherein the ionic surfactant is an alkyl-aryl polyglycol ether sulfate sodium salt.

10. A process for treating a plant growth medium comprising incorporating a pre-mixed blend of coconut coir pith and a horticulturally acceptable surfactant into the plant growth medium in an amount sufficient to promote improved wetting of the plant growth medium during use, before it becomes dried out, and re-wetting of the plant growth medium after it has dried out, the surfactant in the pre-mixed blend being absorbed within the coconut coir pith so that the surfactant releases slowly over time from the coconut coir pith.

11. The process of claim 10 wherein the pre-mixed blend is incorporated into the plant growth medium in an amount sufficient to supply the plant growth medium with from about 0.25 to about 30 fluid ounces of surfactant per cubic yard of the plant growth medium.

12. The process of claim 11 wherein the surfactant is present in the pre-mixed blend in a predetermined percent by weight of the total weight of the pre-mixed blend ranging from about 10% to about 70%.

13. The process of claim 12 wherein the surfactant is present in the pre-mixed blend in an amount of about 50% of the total weight of the pre-mixed blend.

14. The process of claim 11 wherein the surfactant is a non-ionic surfactant.

15. The process of claim 14 wherein the non-ionic surfactant is an alkoxylated polyol.

16. The process of claim 15 wherein the non-ionic surfactants is an ethoxylated alkylphenol.

17. The process of claim 11 wherein the surfactant is an ionic surfactant.

18. The process of claim 17 wherein the ionic surfactant is an alkyl-aryl polyglycol ether sulfate sodium salt.

19. The process of claim 10 wherein the surfactant is present in the pre-mixed blend in an amount ranging from about 10% to about 70% of the total weight of the pre-mixed blend.

20. A plant growth medium having a pre-blended mixture of coconut coir pith and a horticulturally acceptable surfactant incorporated therein in an amount sufficient to promote improved wetting of the plant growth medium during use, before it becomes dried out, and re-wetting of the plant growth medium after it has dried out, the surfactant in the pre-blended mixture being absorbed within the coconut coir pith so that the surfactant releases slowly over time from the coconut coir pith.

21. The plant growth medium of claim 20 wherein the amount of pre-blended mixture incorporated into the plant growth medium is sufficient to supply the plant growth medium with from about 0.25 to about 30 fluid ounces of surfactant per cubic yard of the plant growth medium.

22. The plant growth medium of claim 21 wherein the surfactant is present in the pre-blended mixture in a predetermined percent by weight of the total weight of the pre-blended mixture ranging from about 10% to about 70%.

23. The plant growth medium of claim 22 wherein the surfactant is present in the preblended mixture in an amount of about 50% of the total weight of the pre-blended mixture.

24. The plant growth medium of claim 20 wherein the surfactant is present in the pre-blended mixture in an amount ranging from about 10% to about 70% of the total weight of the pre-blended mixture.

25. The plant growth medium of claim 24 wherein the surfactant is a non-ionic surfactant.

26. The plant growth medium of claim 25 wherein the non-ionic surfactant is an alkoxylated polyol.

27. The plant growth medium of claim 26 wherein the non-ionic surfactants is an ethoxylated alkylphenol.

28. The plant growth medium of claim 24 wherein the surfactant is an ionic surfactant.

29. The plant growth medium of claim 28 wherein the ionic surfactant is an alkyl-aryl polyglycol ether sulfate sodium salt.

* * * * *